US010801426B2

(12) United States Patent
Sixel et al.

(10) Patent No.: US 10,801,426 B2
(45) Date of Patent: Oct. 13, 2020

(54) METHOD FOR STARTING A GASEOUS FUEL COMBUSTION ENGINE

(71) Applicants: CATERPILLAR MOTOREN GMBH & CO. KG, Kiel (DE); CATERPILLAR MOTOREN ROSTOCK GMBH, Rostock (DE)

(72) Inventors: Eike Sixel, Kiel (DE); Kay Schwerdtfeger, Kiel (DE); Daniel Wester, Kiel (DE); Andre Schmidt, Rostock (DE)

(73) Assignee: Caterpillar Motoren GmbH & Co. KG, Kiel (DE)

( * ) Notice: Subject to any disclaimer, the term of this patent is extended or adjusted under 35 U.S.C. 154(b) by 12 days.

(21) Appl. No.: 16/229,376

(22) Filed: Dec. 21, 2018

(65) Prior Publication Data

US 2019/0195149 A1 Jun. 27, 2019

(30) Foreign Application Priority Data

Dec. 22, 2017 (GB) .................................. 1721719.1

(51) Int. Cl.
| | |
|---|---|
| *F02M 1/00* | (2006.01) |
| *F02D 35/02* | (2006.01) |
| *F02D 19/10* | (2006.01) |
| *F02D 41/00* | (2006.01) |
| *F02D 41/22* | (2006.01) |

(Continued)

(52) U.S. Cl.
CPC ....... *F02D 35/023* (2013.01); *F02D 19/0628* (2013.01); *F02D 19/105* (2013.01); *F02D 41/0027* (2013.01); *F02D 41/062* (2013.01); *F02D 41/1446* (2013.01); *F02D 41/221* (2013.01); *F02D 41/3047* (2013.01); *F02D 19/0623* (2013.01); *F02D 19/0647* (2013.01); *F02D 2041/224* (2013.01); *F02D 2200/101* (2013.01); *F02D 2200/1012* (2013.01); *F02D 2200/1015* (2013.01)

(58) Field of Classification Search
CPC .......... F02B 17/005; F02B 19/10; F02D 1/00; F02D 1/04; F02D 35/023; F02D 35/025
USPC ........ 123/275–278, 375, 379–382, 434, 435, 123/436, 672, 676
See application file for complete search history.

(56) References Cited

U.S. PATENT DOCUMENTS

| | | | |
|---|---|---|---|
| 6,009,860 | A | 1/2000 | Brown et al. |
| 6,044,806 | A | 4/2000 | Brown et al. |

(Continued)

FOREIGN PATENT DOCUMENTS

| | | |
|---|---|---|
| DE | 102008004078 A1 | 7/2009 |
| EP | 3198128 A | 8/2017 |
| EP | 3282111 A1 | 2/2018 |

OTHER PUBLICATIONS

Search Report for related United Kingdom Application No. 1709037.4; report dated Dec. 5, 2017.

*Primary Examiner* — John Kwon

(57) ABSTRACT

A method for starting a gaseous fuel internal combustion engine is disclosed. According to the disclosed method, the engine is rotated using a start device until a first speed threshold is reached. After reaching the first speed threshold, pilot fuel is supplied to a plurality of cylinders of the engine to combust the same. After performing an ignition health check, gaseous fuel is supplied to all or a relatively large number of cylinders to start accelerating the engine up to a second speed threshold.

15 Claims, 3 Drawing Sheets

(51) Int. Cl.
*F02D 41/30* (2006.01)
*F02D 41/06* (2006.01)
*F02D 41/14* (2006.01)
*F02D 19/06* (2006.01)

(56) References Cited

U.S. PATENT DOCUMENTS

| | | | |
|---|---|---|---|
| 6,112,765 A | 9/2000 | Boyer | |
| 6,230,683 B1* | 5/2001 | zur Loye | F02B 1/12 |
| | | | 123/27 GE |
| 2015/0252738 A1* | 9/2015 | Sixel | F02D 41/0025 |
| | | | 123/445 |
| 2015/0252741 A1 | 9/2015 | Sixel et al. | |
| 2018/0347456 A1* | 12/2018 | Magnusson | F02B 7/08 |
| 2019/0136791 A1* | 5/2019 | Kurtz | F02D 19/0649 |
| 2019/0338714 A1* | 11/2019 | Sixel | F02D 35/023 |

\* cited by examiner

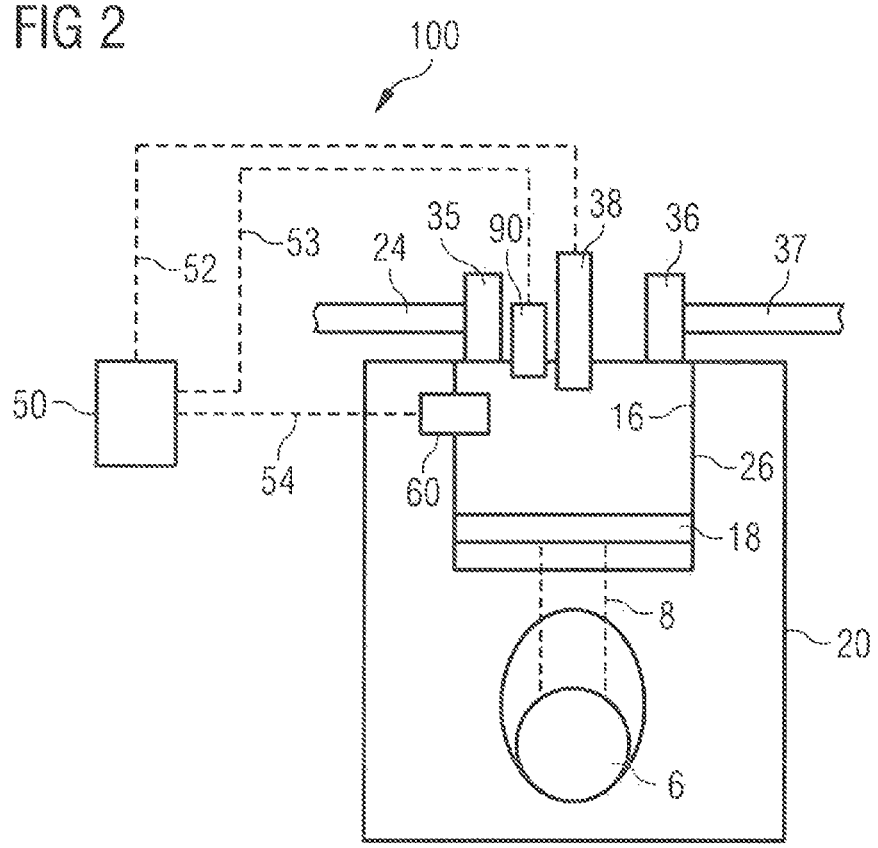

METHOD FOR STARTING A GASEOUS FUEL COMBUSTION ENGINE

CROSS-REFERENCE TO RELATED APPLICATION

This application claims priority under 35 USC § 119 and the Paris Convention to United Kingdom Patent Application No. 1721719.1 filed on Dec. 22, 2017.

TECHNICAL FIELD

The present disclosure generally relates to gaseous fuel internal combustion engines and methods of operating the same, in particular, to a method of starting a gaseous fuel internal combustion engine.

BACKGROUND

Generally, gaseous fuel combustion engines combust a mixture of gaseous fuel and air in a cylinder of the engine. Gaseous fuel combustion engines may comprise, for example, gas engines where a mixture of air and fuel is spark ignited or ignited using a small amount of liquid fuel such as diesel. Similarly, another gaseous fuel combustion engine may be a dual fuel engine operable in a liquid fuel mode and a gaseous fuel mode.

The combustion is characterized by a so-called Lambda value describing an air/fuel ratio, i.e., the ratio of the amount of air in the cylinder to the amount of air required for stoichiometric combustion. During operation of a gaseous fuel combustion engine, the engine may be controlled by controlling, for example, the air/fuel ratio.

Various start procedures for gaseous fuel combustion engines are known. For example, WO 2016/046448 A1 discloses a method for starting up a dual fuel engine.

The present disclosure is directed, at least in part, to improving or overcoming one or more aspects of prior systems.

SUMMARY OF THE DISCLOSURE

According to one aspect of the present disclosure a method for starting a gaseous fuel internal combustion engine having a plurality of gas admission valves respectively associated with a plurality of cylinders comprises rotating the engine until the first speed threshold is reached. The method further comprises starting a supply of pilot fuel to the plurality of cylinders by a pilot fuel system after reaching the first threshold to initiate combustion of the pilot fuel and intake air. The method further comprises determining the status of operation of the pilot fuel system as the pilot fuel is supplied to the plurality of cylinders. Further the method comprises operating the engine by supplying gaseous fuel to the plurality of cylinders via the associated gas admission valves.

In another aspect of the present disclosure an internal combustion engine comprises an engine block defining at least in part a plurality of cylinders, a plurality of gas admission valves respectively associated with the plurality of cylinders and a start device configured to rotate the engine.

Further the engine comprises a control unit configured to control the start device to rotate the engine until a first speed threshold is reached; to start a supply of pilot fuel to the plurality of cylinders after reaching the first threshold to initiate combustion of the pilot fuel and intake air; to determine the status of operation of the pilot fuel system as the pilot fuel is supplied to the plurality of cylinders, and to operate the engine by supplying gaseous fuel to the cylinders via the associated gas admission valves until a second speed threshold above the first speed threshold is reached.

In yet another aspect of the present disclosure, a computer program comprises computer-executable instructions which, when run on a computer, cause the computer to perform the steps of the method of the above aspect.

Other features and aspects of the present disclosure will be apparent from the following description and the accompanying drawings.

BRIEF DESCRIPTION OF THE DRAWINGS

FIG. 2 is a schematic view of a control system for implementing a method of starting the internal combustion engine of FIG. 1 in accordance with the present disclosure; and FIG. 3 is a graph illustrating the behavior of the engine speed, a rail pressure, a gas admission valve opening duration and a gas pressure during the starting of the engine in accordance with the present disclosure.

DETAILED DESCRIPTION

Figure 1:
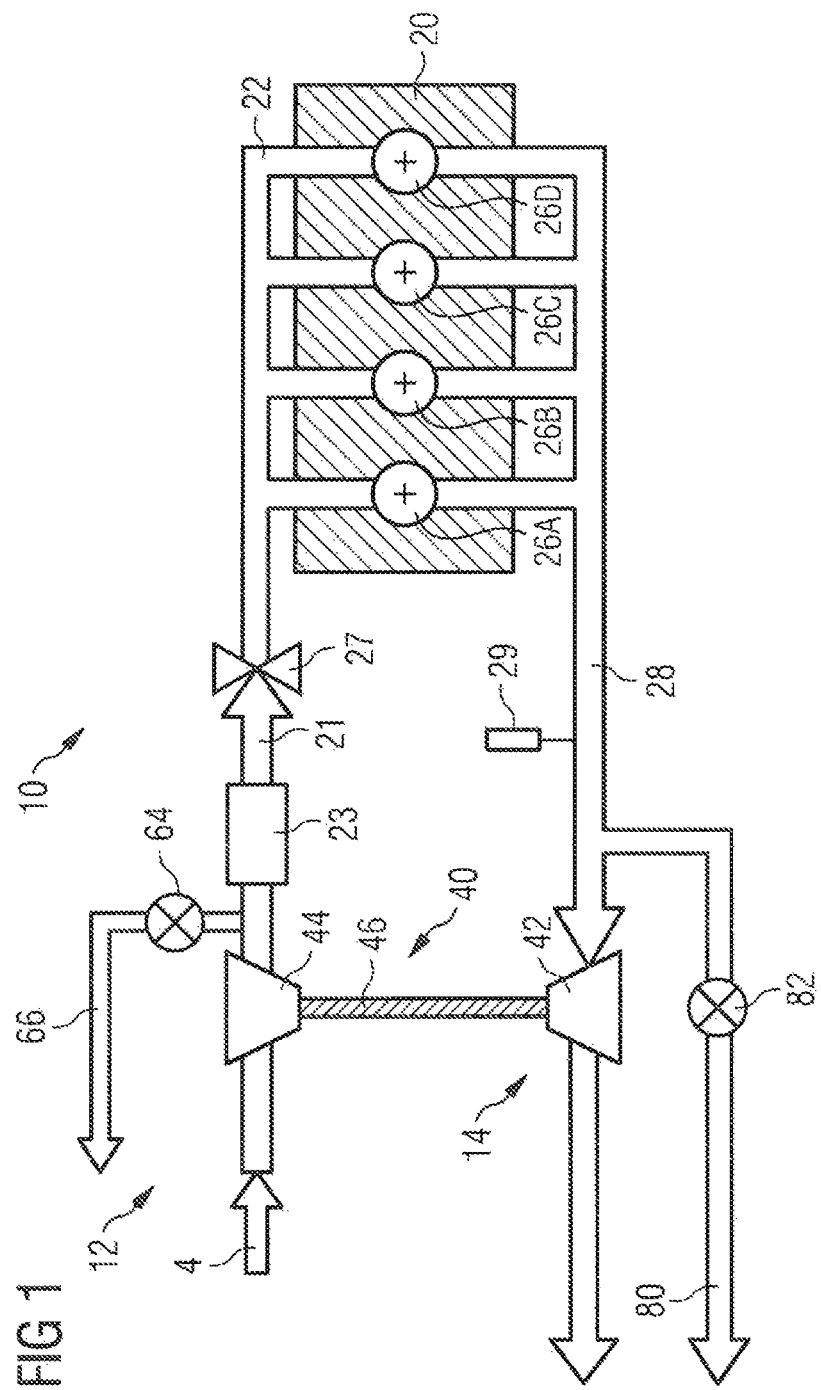
FIG. 1 is a schematic view of an exemplary internal combustion engine in accordance with the present disclosure.

The following is a detailed description of exemplary embodiments of the present disclosure. The exemplary embodiments described herein are intended to teach the principles of the present disclosure, enabling those of ordinary skill in the art to implement and use the present disclosure in many different environments and for many different applications. Therefore, the exemplary embodiments are not intended to be, and should not be considered as a limiting description of the scope of protection. Rather, the scope of protection shall be defined by the appended claims.

The present disclosure may be based in part on the realization that it may be difficult to start an Otto engine, for example, micro-pilot diesel ignited gas engines or spark-ignited gas engines, as well as dual fuel engines operating in gas mode, with the control algorithms that are used for normal operation of the engine. In particular the present disclosure may be based in part on the realization that adaptions and adjustments can be made to improve the start of the engine. For example, the starting procedure could be used to check the ignition system and/or the gas admission valves. Further the number of fired cylinders may be changed during the start-up phase to achieve a smoother start of the engine. In addition, different air/fuel ratio (AFR) controls can be used to further improve the start-up behavior of the engine. For example, a blow-off valve and a waste gate valve or a variable turbine geometry can be controlled to regulate the supply of intake air during the start of the engine.

The present disclosure may further be based on the realization that, when a dual fuel engine is started in gas mode, the ignition system of the same has to be tested before activating the gas supply. Further, the proper functioning of the gas admission valves also has to be checked prior to supplying the gaseous fuel to the engine. In particular, cylinder pressure measurements by a pressure measurement system of the engine may be used to determine whether the ignition system and the gas admission valves are fully functional.

In addition, the present disclosure may be based on the realization that, in a first phase of starting the engine, a large amount of power is required to overcome the inertia of the engine and its components in order to start rotating. Therefore, all cylinders of the engine, or a selected number of cylinders, may be fired during this first phase. After reaching a speed threshold, less power may be required to accelerate the engine to a desired speed, for example, a rated speed of the engine. Therefore, a smaller number of selected cylinders may be fired. This may be achieved, for example, by closing the gas admission valves of one or more cylinders that are to be skipped. After reaching the desired speed and exceeding a load threshold, an AFR control for normal operation of the engine may be activated, and all cylinders may be fired.

Referring now to the drawings, an exemplary embodiment of an internal combustion engine 10 is illustrated in FIG. 1. Internal combustion engine 10 may include features not shown, such as fuel systems, air systems, cooling systems, peripheries, drive train components, etc. For the purposes of the present disclosure, internal combustion engine 10 is a gas engine. One skilled in the art will recognize, however, that internal combustion engine 10 may be any type of internal combustion engine, for example, a dual fuel engine or any other Otto engine that utilizes, at least temporarily, a mixture of gaseous fuel and air for combustion.

Internal combustion engine 10 may be of any size, with any number of cylinders and in any configuration ("V", "in-line", etc.). Internal combustion engine 10 may be used to power any machine or other device, including ships or other marine applications, locomotive applications, on-highway trucks or vehicles, off-highway machines, earth-moving equipment, generators, aerospace applications, pumps, stationary equipment such as power plants, or other engine-powered applications.

Still referring to FIG. 1, internal combustion engine 10 comprises an engine block 20 including a bank of cylinders 26A-26D, at least one fuel tank (not shown), a turbocharger 40 associated with cylinders 26A-26D, an intake system 12 including an intake manifold 22, and an exhaust system 14.

Engine block 20 includes a crank-case (not shown) within which a crank-shaft 6 (see FIG. 2) is supported. Crank-shaft 6 is connected to pistons 18 (see FIG. 2) that are movable within each of cylinders 26A-26D during operation of internal combustion engine 10.

Intake manifold 22 is at least temporarily fluidly connected to each of cylinders 26A-26D. Each of cylinders 26A-26D is provided with at least one inlet valve 35 (see FIG. 2) that is adapted to open or close a fluid connection between an intake passage 24 and a corresponding combustion chamber 16 of cylinders 26A-26D.

An exhaust manifold 28 is connected to each of cylinders 26A-26D. Each of cylinders 26A-26D is provided with at least one exhaust valve 36 disposed in an exhaust passage 37 (see FIG. 2) and being configured to open and close a fluid connection between combustion chamber 16 of each cylinder 26A-26D and exhaust manifold 28.

Generally, when internal combustion engine 10 is operated, a mixture of gaseous fuel and air (in the following referred to as the "mixture") is introduced into the combustion chambers of the plurality of cylinders 26A-26D via an air inlet 4, intake manifold 22 and inlet valves 35, which supply compressed intake air, and gas admission valves 38 (see FIG. 2), which supply gaseous fuel. An air/fuel ratio of the cylinders 26A-26D is controlled by regulating the amount of intake air supplied via intake manifold 22 and/or the amount of gaseous fuel supplied via gas admission valves 38. After combustion, exhaust gases generated by the combustion process are released from cylinders 26A-26D through exhaust manifold 28.

An exhaust sensor 29 may be disposed in exhaust manifold 28 to detect a component of the exhaust from internal combustion engine 10. In the exemplary embodiment described herein, exhaust gas sensor may be a NOx sensor configured to detect an amount of NOx in the exhaust from internal combustion engine 10.

Turbocharger 40 is configured to use the heat and pressure of the exhaust gas of internal combustion engine 10 to drive a compressor 44 for compressing the intake air prior to being supplied to the engine. Specifically, exhaust gas passing a turbine 42 of turbocharger 40 rotates turbine 42, thereby decreasing in pressure and temperature. Compressor 44 is rotatably connected to turbine 42 via a common shaft 46 and driven by turbine 42.

Generally, an outlet of compressor 44 is fluidly connected to an inlet of intake manifold 22 via a compressor connection 21. As shown in FIG. 1, an outlet of compressor 44 is connected to the inlet of intake manifold 22 via a cooler 23. A throttle valve 27 arranged downstream of cooler 23 is configured to open or close the fluid connection between compressor connection 21 and intake manifold 22, thereby enabling or restricting a flow of the compressed intake air from compressor connection 21 into intake manifold 22.

During operation of internal combustion engine 10, the intake air is compressed and cooled before being supplied to cylinders 26A-26D. Within cylinders 26A-26D, further compression and heating of the mixture may be caused by movement of pistons 18 (see FIG. 2). Then, the mixture within the cylinders 26A-26D may be ignited, for example, by using a spark plug or a pilot injection of liquid fuel to initiate the combustion of the mixture at a predetermined ignition timing. The produced exhaust gas is discharged via exhaust manifold 28. An outlet of exhaust manifold 28 is fluidly connected to an inlet of turbine 42. An outlet of turbine 42 may be fluidly connected to, for example, an exhaust gas treatment system (not shown).

Additionally, as indicated in FIG. 1, internal combustion engine 10 is provided with a waste gate system for bypassing turbine 42. The waste gate system includes a waste gate connection 80 and a waste gate valve 82. Alternatively, internal combustion engine 10 may be provided with a variable turbine geometry. Additionally, internal combustion engine 10 may include a blow-off system for discharging intake air downstream of compressor 44 to reduce an intake manifold air pressure. The blow-off system includes a blow-off connection 66 and a blow-off valve 64. It should be appreciated that blow-off connection 66 and blow-off valve 64 may be provided with different configurations than the one shown in FIG. 1, if appropriate. Alternatively, one or more of these components may be omitted.

Turning now to FIG. 2, an exemplary embodiment of a control system 100 for starting the gaseous fuel combustion engine 10 is illustrated. The person skilled in the art will recognize that the exemplary cylinder 26 shown in FIG. 2 demonstrates the principles of the cylinders 26A-26D of FIG. 1. Therefore, the exemplary disclosed configuration shown in FIG. 2 also applies to the cylinders 26A-26D shown in FIG. 1.

FIG. 2 shows a schematic cross-sectional view of cylinder 26. Cylinder 26 defines a combustion chamber 16 and includes a piston 18. Crank-shaft 6 is connected to piston 18 via piston rod 8. Piston 18 is configured to reciprocate within cylinder 26.

Cylinder 26 is connected to intake manifold 22 (FIG. 1) via intake passage 24 and to exhaust manifold 28 via exhaust passage 37. Inlet valve 35 is disposed in intake passage 24, and exhaust valve 36 is disposed in exhaust passage 37. A gas admission valve 38 is provided to supply gaseous fuel to combustion chamber 16 of cylinder 26. In the exemplary embodiment, gas admission valve 38 may be a solenoid-operated gas admission valve. It should be noted that, while FIG. 2 shows gas admission valve 38 being provided to inject gaseous fuel directly into combustion chamber 16, gas admission valve 38 may also be provided in intake passage 24 in association with cylinder 26.

Inlet valve 35 is configured to supply compressed intake air or a mixture of gaseous fuel and air to combustion chamber 16. Exhaust valve 36 is configured to discharge exhaust from combustion chamber 16 to exhaust manifold 28 after combustion.

An ignition device 90 is configured to ignite the mixture of gaseous fuel and air inside combustion chamber 16 at a desired ignition timing. In the embodiment, ignition device 90 is a pilot injector configured to inject a pilot amount of, for example, diesel fuel to ignite the mixture. Further, in other embodiments, a pre-combustion chamber (not shown) may be provided in combustion chamber 16, and ignition device 90 may be a spark plug configured to ignite a pilot amount of gaseous fuel supplied to the pre-combustion chamber in order to initiate combustion of the gaseous fuel and air in combustion chamber 16.

Control system 100 includes a sensor 60 associated with cylinder 26. Sensor 60 may be disposed at least in part within combustion chamber 16. In other exemplary embodiments, sensor 60 may be disposed outside of combustion chamber 16. Sensor 60 is configured to detect a characteristic of the combustion in cylinder 26. In some embodiments, sensor 60 may be a pressure sensor configured to detect a cylinder pressure in cylinder 26. Sensor 60 may be any known pressure sensor and may be configured to detect the pressure within combustion chamber 16 in a known manner.

Control system 100 further includes a control unit 50. Control unit 50 is connected to sensor 60 via a communication line 54 and to gas admission valve 38 via a communication line 52. Control unit 50 is further connected to ignition device 90 via a communication line 53. Control unit 50 is configured to control an ignition timing of the mixture in combustion chamber 16 via ignition device 90. Control unit is also connected to blow-off valve 64 and waste gate valve 82 (see FIG. 1) via further communication lines (not shown). Control unit 50 is configured to control blow-off valve 64 and waste gate valve 82 to adjust an opening area of the same. Further, control unit 50 is configured to receive the results of the detection by sensor 60 and determine at least the characteristic of the combustion in cylinder 26 from the received detection results.

Control unit 50 may be a single microprocessor or dual microprocessors that include means for controlling, among others, an operation of various components of combustion engine 10. Control unit 50 may be a general engine control unit (ECU) capable of controlling internal combustion engine 10 and/or its associated components. Control unit 50 may include all components required to run an application such as, for example, a memory, a secondary storage device, and a processor such as a central processing unit or any other means known in the art for controlling internal combustion engine 10 and its components. Various other known circuits may be associated with control unit 50, including power supply circuitry, signal conditioning circuitry, communication circuitry and other appropriate circuitry. Control unit 50 may analyze and compare received and stored data and, based on instructions and data stored in memory or input by a user, determine whether action is required. For example, control unit 50 may compare received values with the target values stored in memory, and, based on the results of the comparison, transmit signals to one or more components to alter the operation status of the same.

Control unit 50 may include any memory device known in the art for storing data relating to operation of internal combustion engine 10 and its components. The data may be stored in the form of one or more maps or other types of information that describe and/or relate, for example, detection results from a speed sensor (not shown) associated with crank-shaft 6 with different types of controls of engine 10, for example, during the start-up phase of the same, as will be described in more detail below. Each of the maps may be in the form of tables, graphs and/or equations, and may include a compilation of data collected from lab and/or field operation of internal combustion engine 10. The maps may be generated by performing instrumented tests on the operation of internal combustion engine 10 under various operating conditions while varying parameters associated therewith or performing various measurements. Control unit 50 may reference these maps and control operation of one component in response to the desired operation of another component. For example, the maps may contain data on several speed thresholds that are to be used during starting of internal combustion engine 10. In addition, the memory of control unit 50 may include information on desired actuations of blow-off valve 64 and waste gate valve 82 during start-up, for example, based on the current engine speed, the current engine load, etc.

Control unit 50 is configured to control the different components of internal combustion engine 10 during starting of the same. This will be described in more detail with reference to FIG. 3.

In a first phase of the start-up, control unit 50 is configured to prepare combustion engine 10 for starting, for example, by pre-heating one or more components of the same.

Next, control unit 50 is configured to activate a start device (not shown) associated with internal combustion engine 10 at timing $t_1$ in order to start rotating the engine. For example, the start device may be a starter that is operatively connected to crank-shaft 6 and configured to rotate the same. In other embodiments, an air starter system may be used and may be configured to inject compressed air into cylinders 26A-26D of internal combustion engine 10 to start rotating crank-shaft 6. As shown in FIG. 3, this may result in the engine speed increasing. At the same time, a rail pressure of a common rail associated with ignition device 90, i.e. a pilot injector configured to inject a pilot injection of liquid fuel, also increases. The gas pressure at a gas pressure regulating unit (not shown) remains at a low level, for example, about 0.1 bar above atmospheric pressure (bar (g)). The gas system of internal combustion engine 10 remains decompressed without fuel gas.

After reaching a set engine speed using the start device, for example, around 60 rpm, at timing $t_2$, control unit 50 is configured to start a supply of pilot fuel to the plurality of cylinders 26A-26D in order to initiate the combustion of the pilot fuel and intake air in combustion chamber 16. In this state, control unit 50 may be configured to control blow-off valve 64 and waste gate valve 82 to be in a predetermined first position, for example, to be fully closed in order to achieve the maximum possible intake manifold air pressure and supply the maximum possible amount of intake air to the cylinders. It should be appreciated that, in other embodiments, control unit 50 may control blow-off valve 64 and waste gate valve 82 to have a predetermined opening area in order to achieve a desired intake manifold air pressure during this phase.

Next, at $t_3$, control unit 50 is configured to perform an ignition health check on the ignition system of internal combustion engine 10. For example, control unit 50 may receive cylinder pressure measurements from sensor 60 and determine whether ignition device 90 is functional based on the received cylinder pressure measurements. Other engine related measurement values may also be used, for example, an exhaust gas temperature. This check may be performed simultaneously for all cylinders, or in sequence for one or more cylinders at the same time.

In case the ignition health check for all cylinders is passed, control unit 50 then initiates a gas admission valve health test to determine whether all gas admission valves 38 are fully functional. After the ignition health check has been passed, control unit 50 may enable the gas supply to the engine and increase the gas pressure to between around 0.1 bar (g) and around 0.5 bar (g), and start operating gas admission valves 38 to accelerate engine 10. During this phase the gas admission valves may be opened for a pre-defined duration, for example independent from the speed governor and/or the speed of the engine. During the first phase of operation, control unit 50 may receive cylinder pressure measurements from sensor 60 and/or data about the speed increase of the engine and determine whether gas admission valve 38 is functional based on the received measurements. For example, in case of a stuck valve in an opened position, an increased fuel flow will result in an increased cylinder pressure, which increase when compared to other cylinders with functional gas admission valves can be detected. After the check has been passed, control unit 50 may then increase the gas pressure to the desired value of, for example, between around 0.3 bar (g) and around 1.5 bar (g) (in FIG. 4, 1.2 bar (g)) at $t_4$ and proceed with the start procedure.

After activating the gas supply at $t_4$, control unit 50 may be configured to operate internal combustion engine 10 by supplying gaseous fuel to a first number or the full number of selected cylinders via the associated gas admission valves 38. For example, control unit 50 may be configured to supply gaseous fuel to all cylinders 26A-26D of internal combustion engine 10, or to a larger number of said cylinders. As shown in FIG. 3, this results in a further increase of the engine speed. The higher number of cylinders has to be fired to overcome the inertia of internal combustion engine 10 and accelerate the same up to a further speed threshold, for example, a desired low idle speed of internal combustion engine 10.

During this process, for example, upon or prior to reaching the corresponding speed threshold at $t_5$, control unit 50 will control blow-off valve 64 and waste gate valve 82 (or a lever position for varying a turbine geometry) to have a second predetermined configuration, for example, to be fully open to achieve the minimum possible intake manifold air pressure. It will be appreciated that, in other embodiments, control unit 50 may be configured to set a configuration of blow-off valve 64 and/or waste gate valve 82 that is not a fully opened configuration, as long as it is a configuration where the opening area of the valve is larger than in the first configuration that is used when initiating the pilot injection via ignition device 90.

When the desired engine speed, for example, the low idle speed, is reached at timing $t_5$, control unit 50 may be configured to operate internal combustion engine 10 by supplying gaseous fuel to a second number of selected cylinders via the associated gas admission valves 38. In particular, the second number of selected cylinders may be less than the first number of selected cylinders. The reason for this is that less power is required to further increase the engine speed, for example, up to a rated speed of the engine, when the low idle speed has been reached. Therefore, control unit 50 is configured to skip supplying gaseous fuel to a larger number of cylinders, for example, by keeping the associated gas admission valves closed, when the second speed threshold has been reached.

In some embodiments, a closed loop control may be used by control unit 50 for the low load operation of internal combustion engine 10. In particular, an average load of the fired cylinders may be determined, for example, from the measured cylinder pressure of the fired cylinders. If the load decreases below a lower load level, for example, 20% load, one additional cylinder may be skipped to increase the average load. On the other hand, if the average load is above a higher load level, for example, 35% load, one additional cylinder has to be fired to reduce the average load. It will be appreciated that this closed loop control may automatically operate engine 10 with the second (lesser) number of selected cylinders when the engine is accelerated and the cylinder load decreases. Control unit 50 may be configured to perform this closed loop control until a predetermined load threshold is reached. After said load threshold is reached, an air/fuel ratio control during low load operation will be used. In particular, control unit 50 may determine the fuel flow to the fired cylinders to determine a desired intake manifold air pressure. Once the engine is running normally, all cylinders are fired and an appropriate air/fuel ratio control is used.

With the above-described method, control unit 50 can reliably and swiftly start internal combustion engine 10, i.e. increase the speed of the same up to a desired rated speed of, for example, around 500 rpm.

INDUSTRIAL APPLICABILITY

The industrial applicability of the systems and methods for starting a gaseous fuel combustion engine described herein will be readily appreciated from the foregoing discussion. An exemplary machine suited to the disclosure is a large internal combustion engine such as the engines of the series M46DF, M43DF, GCM46, GCM34, M32DF, M34DF, M27DF, M3x manufactured by Caterpillar Motoren GmbH & Co. KG, Kiel, Germany. For example, for the engines of the series M46DF, the first speed threshold may be around 60 rpm, and the second speed threshold may be around 300 rpm. Further, the rated speed may be around 500 rpm. In addition, the load threshold for the lowest load continuous operation may be around 20%, for example, as low as 15%.

It will be readily appreciated that, although the above-described embodiment relates to a pilot-ignited gas engine, the present teachings can also be applied to other gas engines, for example, dual fuel engines.

In some embodiments, control unit 50 may be configured to inject different amounts of pilot liquid fuel prior to reaching the second speed threshold (for example, the low idle speed) and after reaching the same. In particular, the first amount may be greater than the second amount, for example, a maximum possible injection amount of pilot liquid fuel and/or a multi-shot injection of pilot liquid fuel.

It will be appreciated that the foregoing description provides examples of the disclosed systems and methods. However, it is contemplated that other implementations of the disclosure may differ in detail from the foregoing examples. All references to the disclosure or examples thereof are intended to reference the particular example being discussed at that point and are not intended to imply any limitation as to the general disclosure.

Recitation of ranges of values herein are merely intended to serve as a shorthand method for referring individually to each separate value falling within the range, unless otherwise indicated herein, and each separate value is incorporated into the specification as if it were individually recited herein. All method steps described herein can be performed in any suitable order, unless otherwise indicated or clearly contradicted by the context.

Although the preferred embodiments of the present disclosure have been described herein, improvements and modifications may be incorporated without departing from the scope of the following claims.

The invention claimed is:

1. A method for starting a gaseous fuel internal combustion engine having a plurality of gas admission valves respectively associated with a plurality of cylinders, the method comprising:
    rotating the engine until a first speed threshold is reached;
    starting a supply of pilot fuel to the plurality of cylinders by a pilot fuel system after reaching the first speed threshold to initiate combustion of the pilot fuel and intake air;
    determining a status of operation of the pilot fuel system as the pilot fuel is supplied to the plurality of cylinders; and
    operating the engine by supplying gaseous fuel to the plurality of cylinders via the plurality of gas admission valves.

2. The method of claim 1, wherein the status of operation of the pilot fuel system is determined by determining cylinder pressure based data of the plurality of cylinders.

3. The method of claim 1, wherein the status of operation of the pilot fuel system is determined by determining a temperature of an exhaust port connected to at least one of the plurality of cylinders.

4. The method of claim 1, wherein the supply of gaseous fuel to the plurality of cylinders starts after the determination of the status of operation of the pilot fuel system.

5. The method of claim 1, wherein the plurality of gas admission valves are opened for a predefined time period.

6. The method of claim 1, wherein a status of operation of the plurality of gas admission valves is detected during the supply of gaseous fuel to the plurality of cylinders.

7. The method of claim 6, wherein the status of operation of the plurality of gas admission valves is detected by determining a speed increase of the engine.

8. The method of claim 6, wherein the status of operation of the plurality of gas admission valves is detected from cylinder pressure based data.

9. The method of claim 8, wherein the status of operation of the plurality of gas admission valves is detected by a misfiring event.

10. The method of claim 8, wherein the status of operation of the plurality of gas admission valves is detected by an increase of cylinder pressure of at least one of the plurality of gas admission valves.

11. An internal combustion engine, comprising:
    an engine block defining at least in part a plurality of cylinders;
    a plurality of gas admission valves respectively associated with the plurality of cylinders;
    a start device configured to rotate the engine; and
    a control unit configured to:
        control the start device to rotate the engine until a first speed threshold is reached;
        start a supply of pilot fuel from a pilot fuel system to the plurality of cylinders after reaching the first speed threshold to initiate combustion of the pilot fuel and intake air;
        determine a status of operation of the pilot fuel system as the pilot fuel is supplied to the plurality of cylinders
        operate the engine by supplying gaseous fuel to the plurality of cylinders via the associated plurality of gas admission valves until a second speed threshold is reached, wherein the second speed threshold is greater than the first speed threshold.

12. The internal combustion engine of claim 11, wherein the internal combustion engine comprises a dual fuel engine.

13. The internal combustion engine of claim 11, further comprising:
    at least one of a blow-off valve, a waste gate valve or a variable geometry turbine, wherein the at least one of the blow-off valve, the waste gate valve or the variable geometry turbine can be controlled to regulate a supply of intake air to at least one of the plurality of cylinders during the start of the internal combustion engine.

14. The internal combustion engine of claim 11, further comprising:
    a pressure measurement system configured to measure cylinder pressure of at least one of the plurality of cylinders.

15. The internal combustion engine of claim 11, further comprising:
    a temperature sensor configured to measure an exhaust temperature of at least one of the plurality of cylinders.

* * * * *